United States Patent Office 3,365,497
Patented Jan. 23, 1968

3,365,497
PROCESS FOR PREPARING 5-(3-DIMETHYLAMI-
NOPROPYLIDENE)-5H-DIBENZO[a,d]-10,11 - DI-
HYDROCYCLOHEPTENE
Norman L. Wendler, Summit, and David Taub, Metuchen,
N.J., assignors to Merck & Co., Inc., Rahway, N.J., a
corporation of New Jersey
No Drawing. Filed Feb. 2, 1965, Ser. No. 429,917
4 Claims. (Cl. 260—570.8)

This invention relates to derivatives of dibenzocycloheptenes. In particular, the invention is concerned with an improved method of preparing the compound 5-(3-dimethylaminopropylidene) - 5H - dibenzo[a,d] - 10,11-dihydrocycloheptene, which is known to be useful in the field of mental health.

The process of the invention may be illustrated as follows:

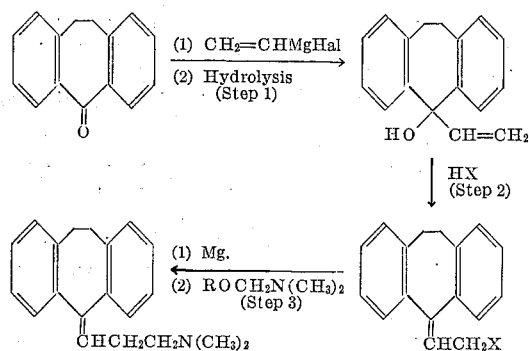

wherein Hal represents halogen, preferably chlorine or bromine, X represents chlorine or bromine and R represents lower alkyl, straight or branched chain, preferably having up to 6 carbon atoms.

As illustrated above, the first step of the process involves the reaction of 5H-dibenzo[a,d]-10,11-dihydrocyclohepten-5-one with a vinylmagnesiumhalide Grignard reagent, followed by hydrolysis of the resulting Grignard adduct. The reaction of the ketone with the Grignard reagent is accomplished in known manner employing an inert, substantially anhydrous, organic solvent conventionally used as the reaction medium and customary elevated temperatures. Preferably, tetrahydrofuran is employed as the solvent for the reaction. Hydrolysis of the Grignard adduct is likewise effected in known manner. The hydrolysis may be carried out under either acidic or basic conditions, but it is generally preferred to carry out the hydrolysis under weakly acidic conditions such as by the use of aqueous ammonium chloride solution. The resulting 5-hydroxy-5-vinyl derivative is readily recovered employing conventional techniques.

The second step of the process involves allylic rearrangement of the 5-hydroxy-5-vinyl derivative, employing either hydrogen chloride or hydrogen bromide. The desired rearrangement is accomplished by reacting the 5-hydroxy-5-vinyl derivative with the hydrogen halide in a substantially anhydrous organic solvent. The temperature and solvent employed in carrying out the reaction are not critical. The reaction may be carried out at room temperatures or below, or at elevated temperatures if desired. It is preferred, however, to carry out the reaction at a temperature below room temperature, i.e., from about 5° to 20° C. Suitable inert organic solvents which may be utilized include glacial acetic acid, dioxane, ether, dimethylformamide and the like. Of the mentioned solvents, glacial acetic acid is preferred. The resulting haloethylidene derivative is readily recovered employing conventional techniques.

In the last step of the process (Step 3), the haloethylidene derivative is reacted with magnesium to form the Grignard reagent and the latter coupled with an alkoxymethyl dimethylamine. The preparation of the Grignard reagent is accomplished by contacting the haloethylidene derivative with magnesium in an inert, substantially anhydrous, organic solvent, and at an elevated temperature. However, neither the solvent or temperature employed is critical. As suitable solvents, there may be mentioned tetrahydrofuran, ether or mixtures of ethers with hydrocarbons. Although elevated temperatures are preferred, the reaction can be carried out at room temperature. The coupling of the Grignard reagent with the alkoxymethyl dimethylamine is carried out in an inert, substantially anhydrous, organic solvent, and at elevated temperatures. Preferably, the same solvent and temperature used for the preparation of the haloethylidene Grignard reagent is employed. However, again, the choice of solvent and temperature is not critical and other solvents and temperatures, as mentioned above with regard to the preparation of the haloethylidene Grignard reagent, may be employed. Recovery of the product is accomplished using conventional techniques.

As noted hereinabove, the end compound, prepared in accordance with the instant invention, is a known compound which has been found to be useful in the field of mental health. The starting compound and other reactants employed in the process of this invention can be prepared as described in the literature.

The following examples are illustrative of the process of this invention.

*Example 1.—5-hydroxy-5-vinyl-5H-dibenzo[a,d]-
10,11-dihydrocycloheptene*

A 100 ml. 3-neck flask fitted with stirrer, Dry Ice-acetone condenser, nitrogen inlet and addition funnel is charged with 1.17 g. (48 millimoles) of magnesium turnings. The system is "flamed-out" with a heat gun and cooled under dry nitrogen. The magnesium metal is covered with 10 ml. of dry tetrahydrofuran and 2–3 ml. of a solution of 5.25 g. (49 millimoles) of vinyl bromide in 10 ml. of tetrahydrofuran is added. The reaction mixture is warmed slightly until the reaction is started. The vinyl bromide solution is added dropwise, with stirring, at such a rate as to maintain a temperature of 50–60° C. The addition is complete in 15 minutes and stirring is continued under gentle reflux until all of the magnesium is consumed (2 hours). A solution of 5.0 g. (24 millimoles) of 5H-dibenzo[a,d]-10,11-dihydrocyclohepten-5-one in 25 ml. of tetrahydrofuran is added, with stirring, to the warm reaction mixture at a rate sufficient to maintain a temperature of 40–50° C. The addition is complete in 25 minutes. Stirring and heating (50° C.) are continued for 1 hour. At the end of this time, a thin-layer cromatographic probe ($Al_2O_3$–1:1 benzene-cyclohexane) indicates that the reaction is complete. The reaction mixture is chilled in an ice-bath and treated, dropwise, with 25 ml. of saturated ammonium chloride solution. The aqueous layer is extracted with two 15 ml. portions of ether and the combined ether-tetrahydrofuran solutions are washed with 15 ml. of saturated sodium chloride solution, dried over anhydrous magnesium sulfate and taken to dryness in vacuo to yield 5.90 g. of the vinyl carbinol as a yellow oil which exhibits the following properties:

$\lambda_{max.}^{CHCl_3}$ 2.7, 2.87, 6.18, 6.75, 6.9, 7.13, 7.62, 7.9, 8.63 9.0, 9.48, 9.83 and 10.35$\mu$. $\lambda_{max.}^{MeOH}$ 2730 (sh.)

($E_{cm.}^{1\%}$ 470); 2700 (sh.), ($E_{cm.}^{1\%}$ 557); 2660 (sh.), ($E_{cm.}^{1\%}$ 645); and 2630 ($E_{cm.}^{1\%}$ 690).

Example 2.—5-(β-bromoethylidene)-5H-dibenzo[a,d]-10,11-dihydrocycloheptene

A solution of 1.20 g. (5.07 millimoles) of crude 5-hydroxy - 5 - vinyl-5H-dibenzo[a,d]-10,11-dihydrocycloheptene in 15 ml. of glacial acetic acid is chilled to 10° C. and 10 ml. of a 15% solution of anhydrous hydrogen bromide on glacial acetic acid added. The reaction mixture is stirred at 10–15° C. for ½ hour, then taken to dryness in vacuo, flushed with xylene and pumped down on an oil pump to yield 1.44 g. of an oil which partially crystallizes. Chromatography of the crude product on neutral alumina affords white crystalline 5-(β-bromoethylidene) - 5H - dibenzo[a,b]-10,11-dihydhocylcloheptene, M.P. 108–110° C.;

$\lambda_{max.}^{MeOH}$ 2425 (13,285); and $\lambda_{max.}^{CHCl_3}$ 6.15, 6.73, 6.94, 7.35, 8.37 and 9.1μ.

*Analysis.*—Calcd. for $C_{17}H_{15}Br$: C, 68.23; H, 5.05; Br, 26.71. Found: C, 68.33; H, 4.86; Br, 26.11.

Example 3.—5-(γ-dimethylaminopropylidene)-5H-dibenzo[a,d]-10,11-dihydrocycloheptene hydrochloride A "cyclic reactor," as described in the literature, is employed in the Grignard reaction. This reactor consists, in ascending order, of a 100 ml. 3-neck reservoir flask (2 necks stoppered) of refluxing ether, a sidearm column column containing magnesium turnings immersed in ether, a condenser, and a dropping funnel with a nitrogen inlet. The magnesium in the reactor column is amalgamated by standing overnight under a saturated ether solution of mercuric bromide. After draining off this solution, the reactor column is refluxed with ether for 1.5 hours, and, finally, the magnesium is further activated with 0.2 ml. of methyl iodide in 1 ml. of ether, followed by refluxing in ether for 1.5 hours. In these and all subsequent steps, the ether level in the reactor is maintained just above the surface of the magnesium and the system is kept under dry nitrogen. The reservoir flask is charged with 15 ml. of dry ether and refluxing begun. The dropwise return rate (from the reactor column to the reservoir flask) is adjusted such that the ether level in the reactor remains constant. One gram (3.34 millimoles) of 5-(β-bromoethylidene) - 5 - dibenzo[a,d]-10,11-dihydrocycloheptene dissolved in 30 ml. of dry ether is added to the reactor column at a steady rate of 1 drop/30 seconds (ratio of reflux-drop rate to addition-drop rate is 30:1). Addition is complete in 3.5 hours, after which time the reactor column is refluxed for an addiitonal 30 minutes. The reaction mixture is cooled to 25° C., the reactor column assembly on the reservoir flask is replaced by a stirrer, and a reflux condenser (with nitrogen inlet) and addition funnel added to the previously stoppered necks of the reservoir flask. A solution of 0.533 g. (3.30 millimoles) of isobutoxymethyl dimethylamine in 10 ml. of dry ether is added dropwise, with stirring, to the Grignard solution over a period of 5 minutes. The resulting mixture is refluxed for 0.5 hour, kept overnight at room temperature, and refluxed for an additional hour. The reaction mixture is chilled in an ice-bath and treated with 20 ml. of saturated ammonium chloride solution. The aqueous layer is extracted with ether and the ether extract washed successively with 10 ml. of 2.5 N HCl and 15 ml. of water. The aqueous phase is made alkaline with concentrated ammonium hydroxide and extracted with ether. The basic ether extract is washed with 15 ml. of saturated salt solution, dried over magnesium sulfate, and evaporated to dryness in vacuo, yielding 540 mg. of oily free amine. The free amine, in 10 ml. of ether, is treated with 4 ml. of ether saturated with hydrogen chloride and the mixture taken to dryness. The gummy residue is dissolved in ethanol, treated with charcoal and filtered through celite. The filtrate is boiled down to a small volume, diluted with ether to the point of cloudiness and scratched, yielding 460 mg. of crude 5-(γ-dimethylaminopropylidene) - 5H - dibenzo[a,d]-10,11-dihydrocycloheptene hydrochloride, M.P. 180–185° C.

We claim:
1. A process for preparing 5-(γ-dimethylaminopropylidene) - 5H - dibenzo[a,d] - 10,11 - dihydrocycloheptene, which comprises the steps of
   (1) reacting 5H-dibenzo[a,d]-10,11-dihydrocyclohepten-5-one with a vinylmagnesiumhalide Grignard reagent in an inert, substantially anhydrous, organic solvent;
   (2) hydrolyzing the Grignard adduct resulting from step (1) to form the compound 5-hydroxy-5-vinyl-5H-dibenzo[a,d]-10,11-dihydrocycloheptene;
   (3) contacting the product of step (2) with a hydrogen halide of the formula HX, wherein X is a halogen having an atomic weight greater than 35 and less than 80 in an inert, substantially anhydrous, organic solvent to form the corresponding 5-haloethylidene derivative;
   (4) contacting the derivative obtained from step (3) with magnesium in an inert, substantially anhydrous, organic solvent to form the Grignard reagent thereof; and
   (5) contacting the Grignard reagent obtained in step (4) with a loweralkoxymethyl dimethylamine in an inert, substantially anhydrous, organic solvent.
2. The process for preparing 5-(γ-dimethylaminopropylidene)-5H-dibenzo[a,d] - 10,11-dihydrocycloheptene, which comprises the steps of
   (1) reacting 5H-dibenzo[a,d] - 10,11-dihydrocyclohepten-5-one with vinylmagnesiumbromide in substantially anhydrous tetrahydrofuran;
   (2) hydrolyzing the product of step (1) in saturated ammonium chloride solution to form the compound 5-hydroxy-5-vinyl-5H-dibenzo[a,d] - 10,11 - dihydrocycloheptene;
   (3) contacting the product of step (2) with hydrogen bromide in glacial acetic acid to form the corresponding 5-bromoethylidene derivative;
   (4) contacting the derivative obtained from step (3) with mangesium in substantially anhydrous ether to form the Grignard reagent thereof; and
   (5) contacting the Grignard reagent obtained in step (4) with isobutoxymethyl dimethylamine in substantially anhydrous ether.
3. A process for preparing 5-(γ-dimethylaminopropylidene) - 5H - dibenzo[a,d] - 10,11 - dihydrocycloheptene, which comprises contacting a compound of the structural formula

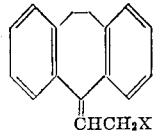

wherein X is a halogen having an atomic weight greater than 35 and less than 80, with magnesium in an inert, substantially anhydrous solvent to form the Grignard reagent thereof and contacting said Grignard reagent with a loweralkoxymethyl dimethylamine in an inert, substantially anhydrous, organic solvent.

4. The process for preparing 5-(γ-dimethylaminopropylidene)-5H-dibenzo[a,d] - 10,11-dihydrocycloheptene, which comprises contacting 5-(β-bromoethylidene)-5H-dibenzo[a,d]-10,11-dihydrocycloheptene with magnesium in substantially anhydrous ether to form the Grignard reagent thereof, and contacting said Grignard reagent with isobutoxymethyldimethylamine in substantially anhydrous ether.

(References on following page)

References Cited

FOREIGN PATENTS 938,201  10/1963  Great Britain.

OTHER REFERENCES

Brown et al.: "Chemical Abstracts," vol. 41, pp. 391–2 (1947).

Hellmann et al.: "Chemical Astracts," vol. 54, pp. 24751–3 (1960).

CHARLES B. PARKER, *Primary Examiner.*

R. V. HINES, *Assistant Examiner.*